(12) United States Patent
Hoek et al.

(10) Patent No.: US 9,767,695 B2
(45) Date of Patent: Sep. 19, 2017

(54) STAND ALONE BLIND SPOT DETECTION SYSTEM

(71) Applicant: Gentex Corporation, Zeeland, MI (US)

(72) Inventors: Steven G. Hoek, Holland, MI (US); Frederick T. Bauer, Holland, MI (US); Michael F. Lisowski, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 329 days.

(21) Appl. No.: 13/939,463

(22) Filed: Jul. 11, 2013

(65) Prior Publication Data

US 2014/0015972 A1    Jan. 16, 2014

Related U.S. Application Data

(60) Provisional application No. 61/670,441, filed on Jul. 11, 2012.

(51) Int. Cl.
*G08G 1/16* (2006.01)
*B60R 1/00* (2006.01)
*B60R 1/12* (2006.01)

(52) U.S. Cl.
CPC ............ *G08G 1/167* (2013.01); *B60R 1/007* (2013.01); *B60R 1/12* (2013.01); *B60R 2001/1253* (2013.01)

(58) Field of Classification Search
CPC .......... G08G 1/167; B60R 1/007; B60R 1/12; B60R 2001/1253
See application file for complete search history.

(56) References Cited

U.S. PATENT DOCUMENTS

| 6,151,065 | A  | * | 11/2000 | Steed | B60Q 1/0023 348/148 |
| 6,693,519 | B2 | * | 2/2004 | Keirstead | B60R 1/00 340/435 |
| 6,744,353 | B2 |   | 6/2004 | Sjonell | |
| 6,927,677 | B2 | * | 8/2005 | Anderson | B60Q 1/2665 280/727 |
| 7,965,336 | B2 |   | 6/2011 | Bingle et al. | |
| 7,991,522 | B2 | * | 8/2011 | Higgins-Luthman | B60R 1/00 701/28 |
| 8,044,776 | B2 | * | 10/2011 | Schofield | B60C 23/00 340/425.5 |
| 8,118,501 | B2 |   | 2/2012 | Buschmann | |
| 8,310,353 | B2 |   | 11/2012 | Hinninger et al. | |
| 2003/0098908 | A1 | * | 5/2003 | Misaiji | B60R 1/00 348/148 |
| 2003/0122930 | A1 | * | 7/2003 | Schofield | B60R 1/00 348/148 |

(Continued)

FOREIGN PATENT DOCUMENTS

CN       201751235 U    2/2011

*Primary Examiner* — Thai Tran
*Assistant Examiner* — Christopher T Braniff
(74) *Attorney, Agent, or Firm* — Price Heneveld LLP; Bradley D. Johnson

(57) ABSTRACT

A blind spot detection system for a vehicle having an external rearview device including a substrate having an at least partially transmissive portion. An imaging device positioned behind the at least partially transmissive portion and including a field of view that extends through the substrate at an angle away from the vehicle in the general direction of a vehicle blind spot.

19 Claims, 7 Drawing Sheets

(56) References Cited

U.S. PATENT DOCUMENTS

| | | | |
|---|---|---|---|
| 2008/0100939 A1* | 5/2008 | Brester | B60R 1/0605 359/872 |
| 2009/0040306 A1* | 2/2009 | Foote | B60Q 1/2665 348/148 |
| 2009/0059403 A1 | 3/2009 | Chang | |
| 2009/0244741 A1 | 10/2009 | Schondorf et al. | |

\* cited by examiner

STAND ALONE BLIND SPOT DETECTION SYSTEM

CROSS-REFERENCE TO RELATED APPLICATION

This application claims the benefit of U.S. Provisional Application No. 61/670,441 filed on Jul. 11, 2012, entitled, STAND ALONE BLIND SPOT DETECTION SYSTEM, the entire contents of which are incorporated herein by reference.

BACKGROUND OF THE INVENTION

The invention generally relates to a blind spot detection system, and more particularly, to a stand alone blind spot detection system for use with an external rearview device of a vehicle.

SUMMARY OF THE PRESENT INVENTION

One aspect of the present invention includes a blind spot detection system for a vehicle having an external rearview device including a substrate having an at least partially transmissive portion. An imaging device is positioned behind the at least partially transmissive portion and includes a field of view that extends through the substrate at an angle away from the vehicle in the general direction of a vehicle blind spot.

Another aspect of the present invention includes an external rearview assembly for a vehicle having a substrate including an image display portion and an at least partially transmissive portion. The image display portion provides a rearward field of view to a vehicle driver. An imaging device is positioned behind the at least partially transmissive portion and includes a field of view that extends through the substrate and covers an area disposed between the field of view of the image display portion and a peripheral line of vision extending from inside the vehicle.

Yet another aspect of the present invention includes an external rearview assembly for a vehicle having an electrochromic substrate that includes a first element defining first and second surfaces. A second element defines third and fourth surfaces. A portion of the electrochromic substrate includes an at least partially transmissive window proximate a top inside corner of the electrochromic substrate. The electrochromic substrate is configured to provide a driver with a first field of view. An imaging device is proximate the at least partially transmissive window and defines a second field of view that extends through the electrochromic substrate and covers an area generally disposed between a side of the vehicle and the first field of view.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
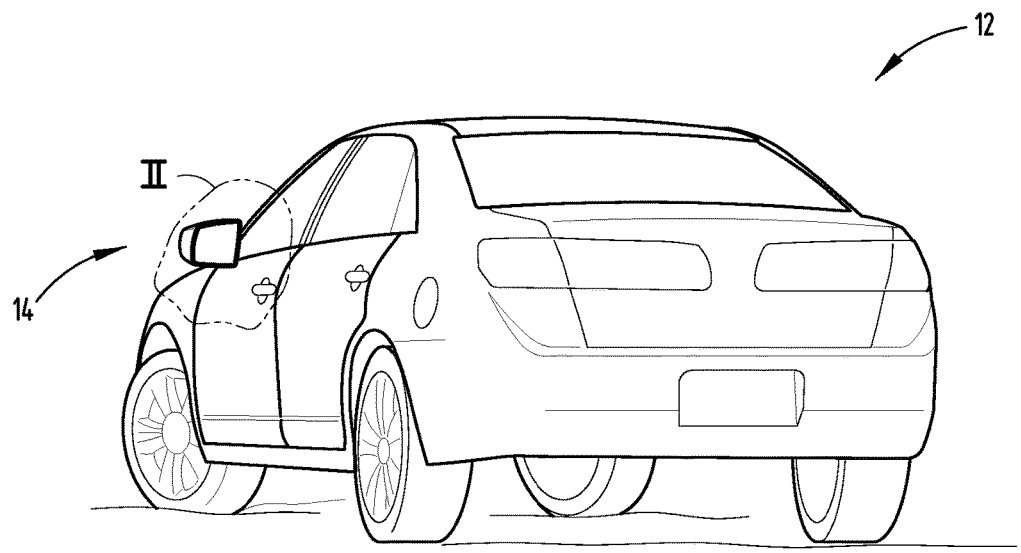
FIG. 1 is a rear perspective view of a vehicle incorporating one embodiment of a blind spot detection system of the present invention disposed in a rearview device.
Figure 2:
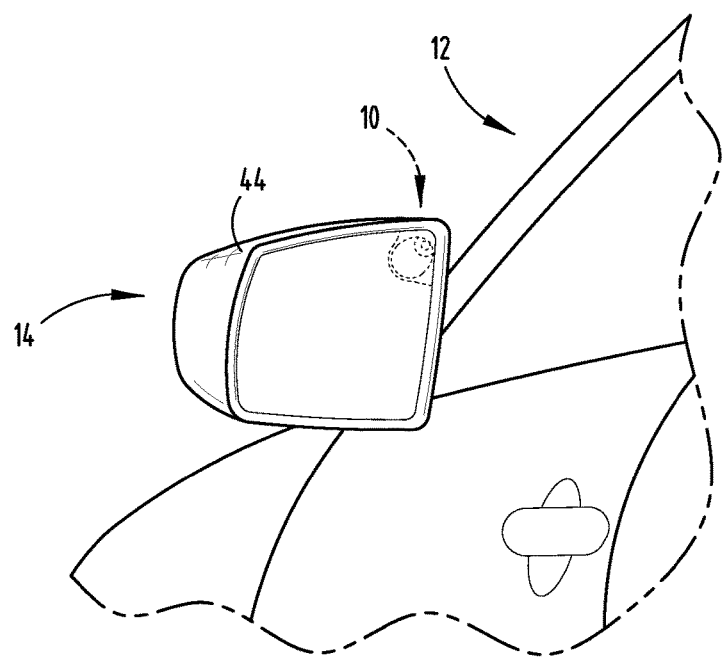
FIG. 2 is a rear front elevational view of area II of FIG. 1.
Figure 3:
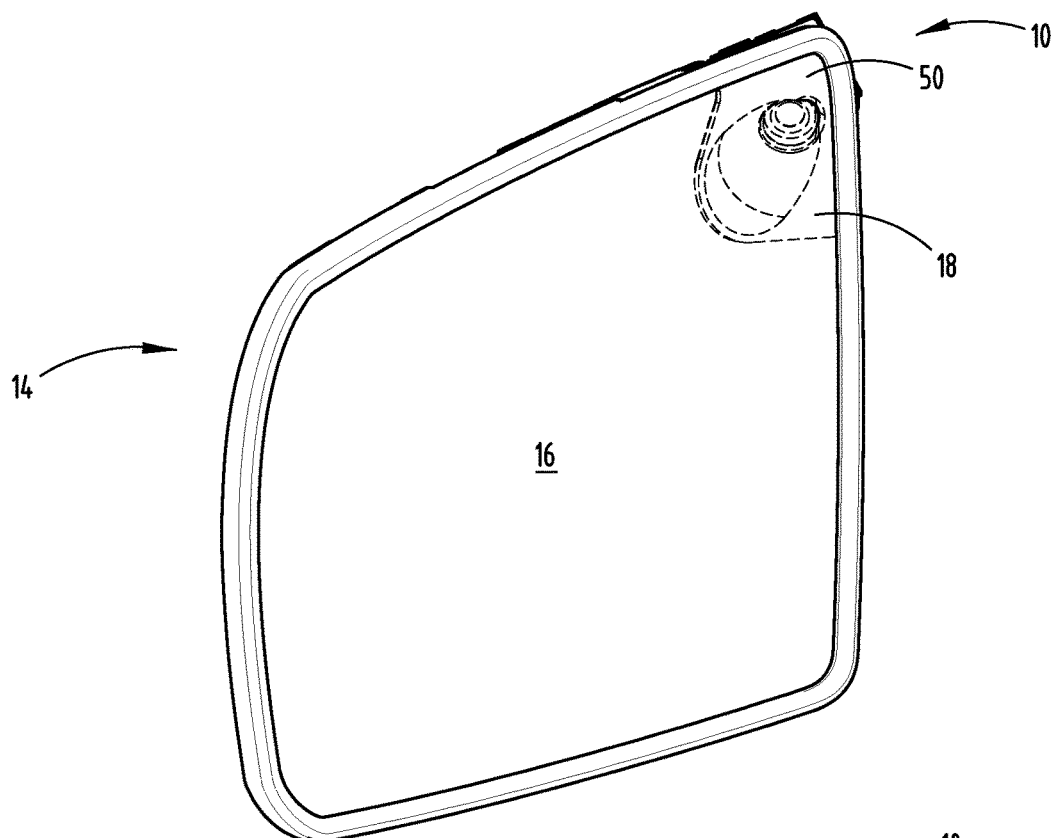
FIG. 3 is a top perspective view of the blind spot detection system with a housing removed.
Figure 4:
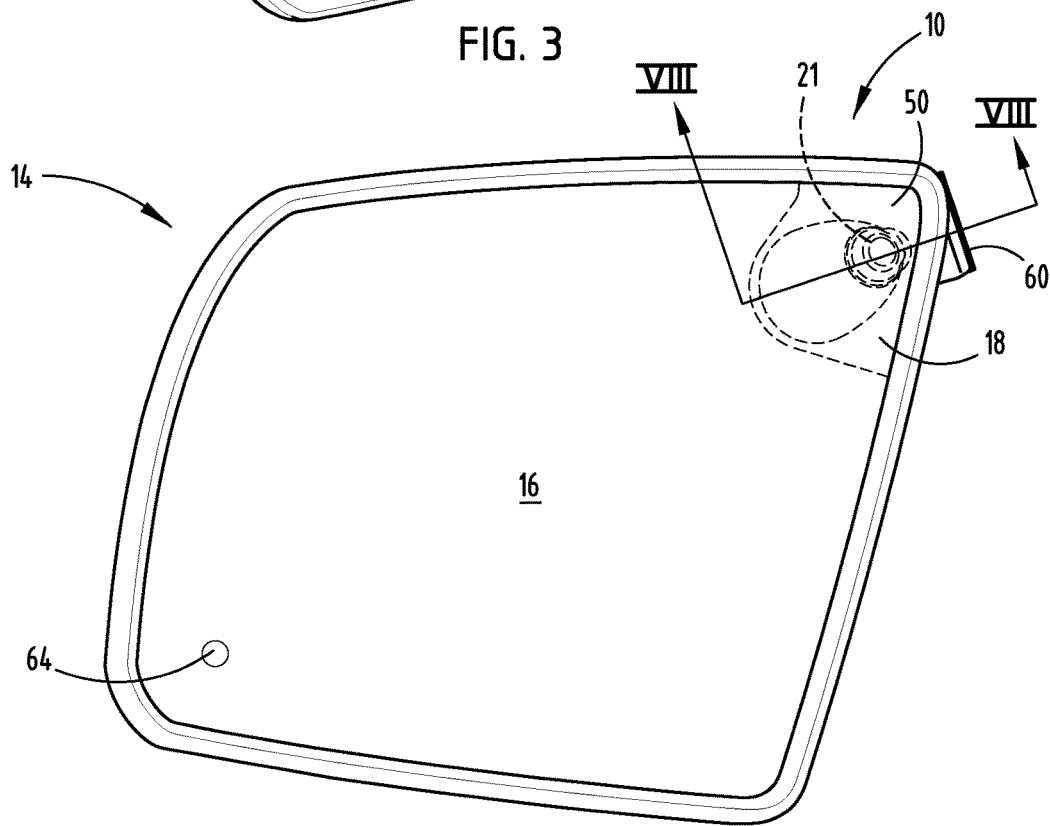
FIG. 4 is a front elevational view of the blind spot detection system of FIG. 3.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a blind spot detection system for a vehicle 12 having an external rearview device 14 including a substrate 16 having an at least partially transmissive portion 18. An imaging device 20 is positioned behind the at least partially transmissive portion 18 and includes a field of view 22 that extends through the substrate 16 at an angle away from the vehicle 12 in the general direction of a vehicle blind spot area 24.

Figure 11:
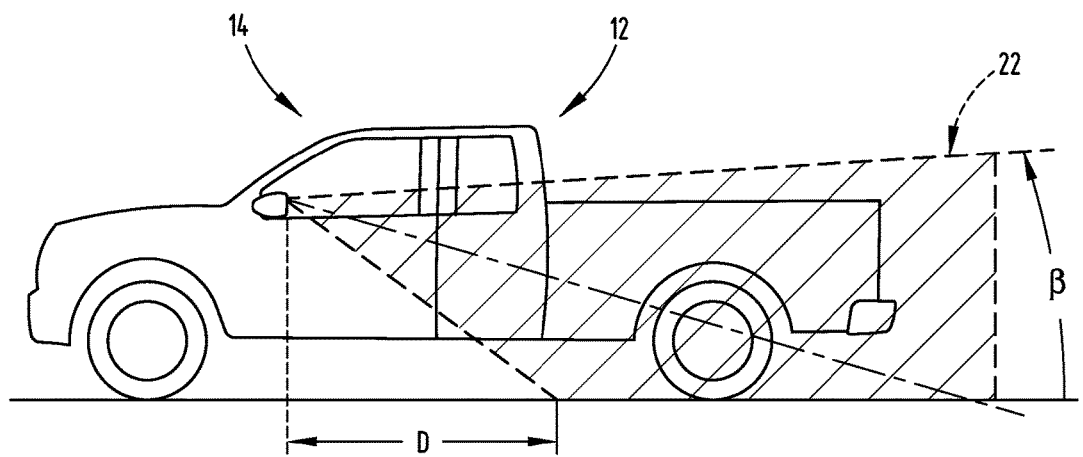
FIG. 11 is a side elevational view of one embodiment of a field of view of a blind spot detection system of the present invention.
Figure 12:
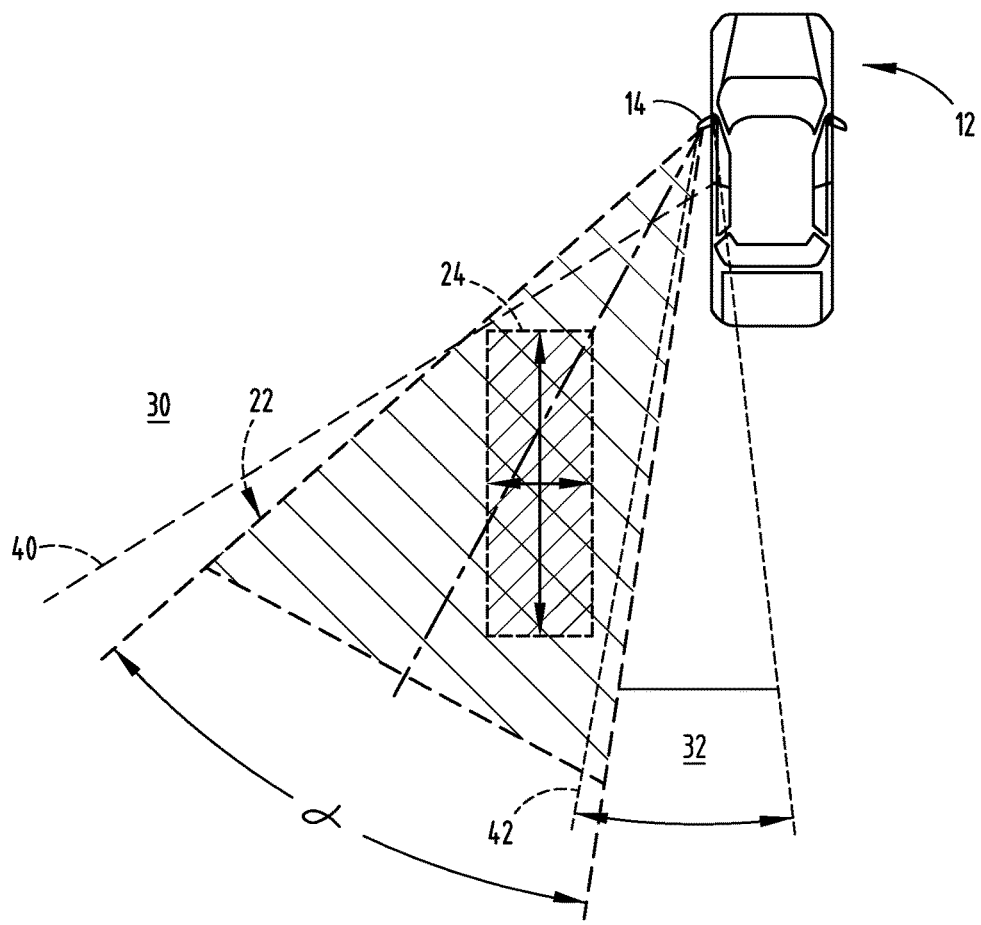
FIG. 12 is a top plan view of the field of view of another embodiment of the blind spot detection system of the present invention.
Figure 13:
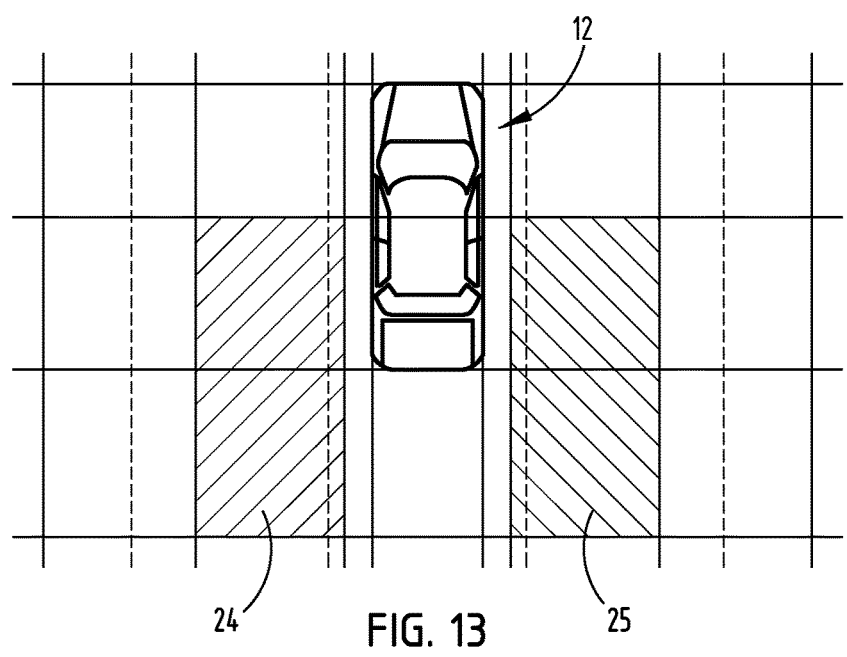
FIG. 13 is a top plan view of the blind spot areas generally detected by the blind spot detection systems of the present invention.

The blind spot detection system 10 of the present invention is generally designed for use in a vehicle that includes a driver side blind spot area 24, which is generally shown relative to a left driver side vehicle in FIGS. 11-13. A driver generally depends on a peripheral vision area 30 and a primary field of view 32 rendered by the external rearview device 14. The driver side blind spot area 24 is generally located in the space between a line defining the bounds of peripheral view of a driver (the peripheral vision line 40) and the outboard most field of view (rearview device outboard vision line 42) provided by a driver side rearview device. To avoid a collision, drivers are oftentimes required to glance rearward to confirm that another vehicle is not located in the driver side blind spot area 24 before changing lanes or making a turn. In these instances, when the driver is not looking forward, the driver runs the risk of compromising the safety of himself and passengers located in the vehicle 12. Accordingly, the blind spot detection system 10 assists the driver by minimizing or eliminating the need of a driver to glance rearward to confirm another vehicle is not in the driver side blind spot area 24. The blind spot detection system 10 utilizes an imaging device 20, which indicates whether another vehicle or other object is located in the driver side blind spot area 24 of the vehicle 12. The blind spot detection system 10 is coupled to a power and data plug disposed inside an external rearview housing 44. The blind spot detection system 10 is constructed as a stand alone device adapted for plug-n-play functionality inside the external rearview housing 44. Accordingly, additional devices and controls are generally unnecessary for proper operation of the blind spot detection system 10 when properly installed in the vehicle 12.

The blind spot detection system 10 is generally configured to cover a detection area that is not generally viewable by the driver without the driver glancing rearward. More specifically, the blind spot detection system 10 is designed to cover a detection area that extends from the peripheral vision line 40 of the driver rearward to the rearview device outboard vision line 42 provided by the external rearview device 14. Accordingly, not only is the driver able to safely confirm that objects are not forward of the vehicle 12, but the driver is also able to confirm, by way of the external rearview device 14, that other vehicles or objects are not disposed proximate the driver side of the vehicle 12, all the way from a substantially lateral position next to the vehicle 12 to a very rearward position behind the vehicle 12. Thus, the dangers associated with the driver side blind spot area 24 are substantially minimized, or even eliminated.

Figure 5:
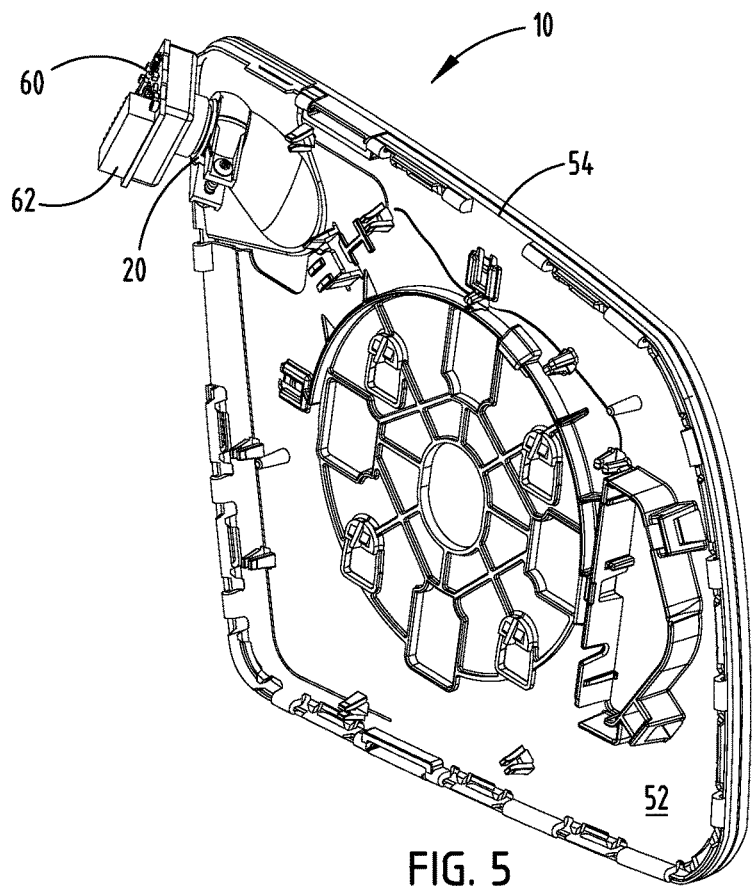
FIG. 5 is a first side top perspective view of the blind spot detection system of FIG. 3.
Figure 6:
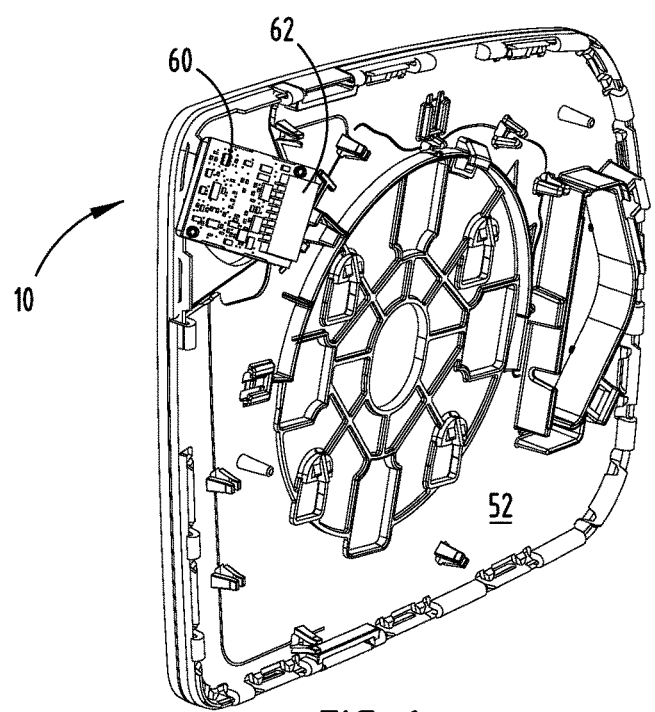
FIG. 6 is a second side top perspective view of the blind spot detection system of FIG. 5.
Figure 7:
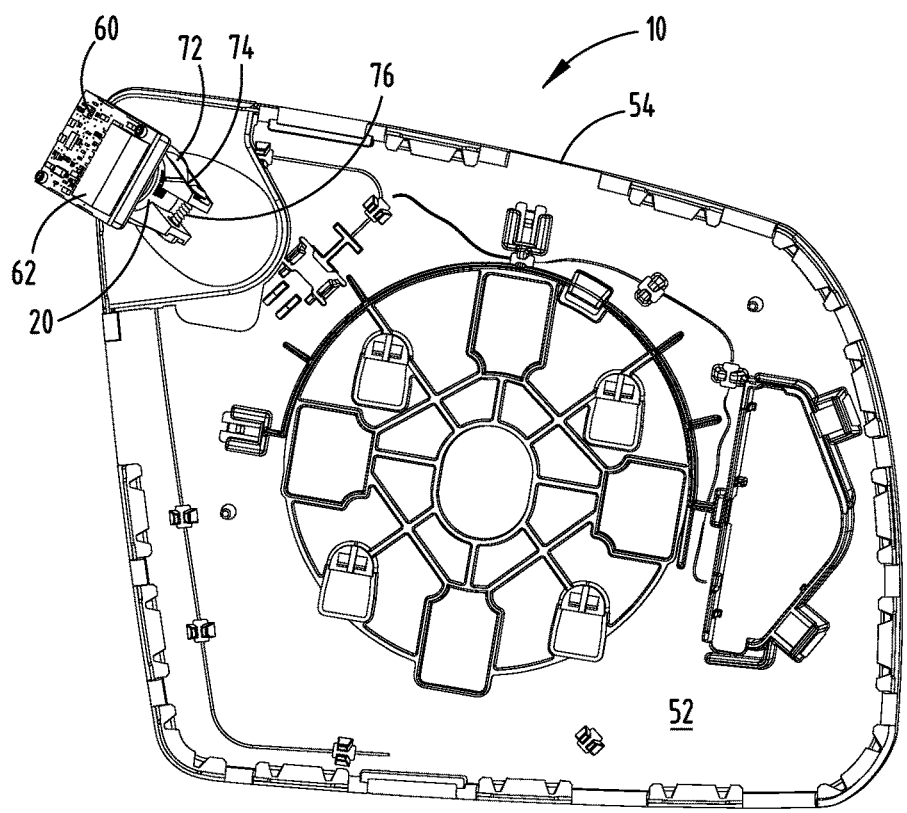
FIG. 7 is a rear elevational view of the blind spot detection system of FIG. 3.

Referring to FIGS. 3-8, in one embodiment of the present invention, the imaging device 20 of the external rearview device 14 is disposed at an upper inside corner 50 thereof. Stated differently, the imaging device 20 is positioned in the upper corner 50 of the external rearview device 14 closest to the vehicle 12. In this position, the imaging device 20 has a sufficient field of view to collect relevant image data that relates to other vehicles or objects that may be present in the driver side blind spot area 24 of the vehicle 12. The imaging device 20 may be positioned behind the at least partially transmissive portion 18, which may be defined by a window and is adjacent a lens 21 of the imaging device 20. As shown in FIG. 5, the imaging device 20 is generally disposed on a carrier plate 52 proximate a rear side 54 of the substrate 16 of the external rearview device 14. It is contemplated that the external rearview device 14 may include a single substrate 16 of reflective material, such as a mirrored glass, or may include an electrochromic system having a first element defining a first surface and a second surface, a second element defining a third surface and a fourth surface, and an electrochromic material disposed therebetween. In this instance, the imaging device 20 is disposed in abutting contact with the fourth surface of the second element, or in close proximity to the fourth surface of the second element. Alternatively, a portion of the second element may be cut away, exposing the first element. In this case, the imaging device 20 is positioned proximate the second surface of the first element.

Regardless of the construction of the external rearview device 14, the carrier plate 52, disposed behind the external rearview device 14, is configured to support the blind spot detection system 10 in close proximity to the substrate 16. The carrier plate 52 also supports a circuit board 60 that is coupled with the blind spot detection system 10 and which relays information to a vehicle interface system 62 coupled to the carrier plate 52, or disposed on the external rearview device 14 in such a way that the driver may glance at the external rearview device 14 and receive a visual confirmation that another vehicle or object is or is not located in the driver side blind spot area 24. In one embodiment, a blind spot detection indicator 64 (FIG. 4) is located on an outer edge of the substrate 16 and is coupled to the circuit board 60. As an example, the blind spot detection indicator 64 may be a light-emitting diode (LED) that illuminates upon detection by the imaging device 20 of another vehicle or object entering the driver side blind spot area 24 of the vehicle 12. The carrier plate 52 also acts as a support to maintain the external rearview device 14 inside the exterior rearview housing 44. Accordingly, the imaging device 20 is hidden between the external rearview device 14 and the rearview housing 44.

Figure 8:
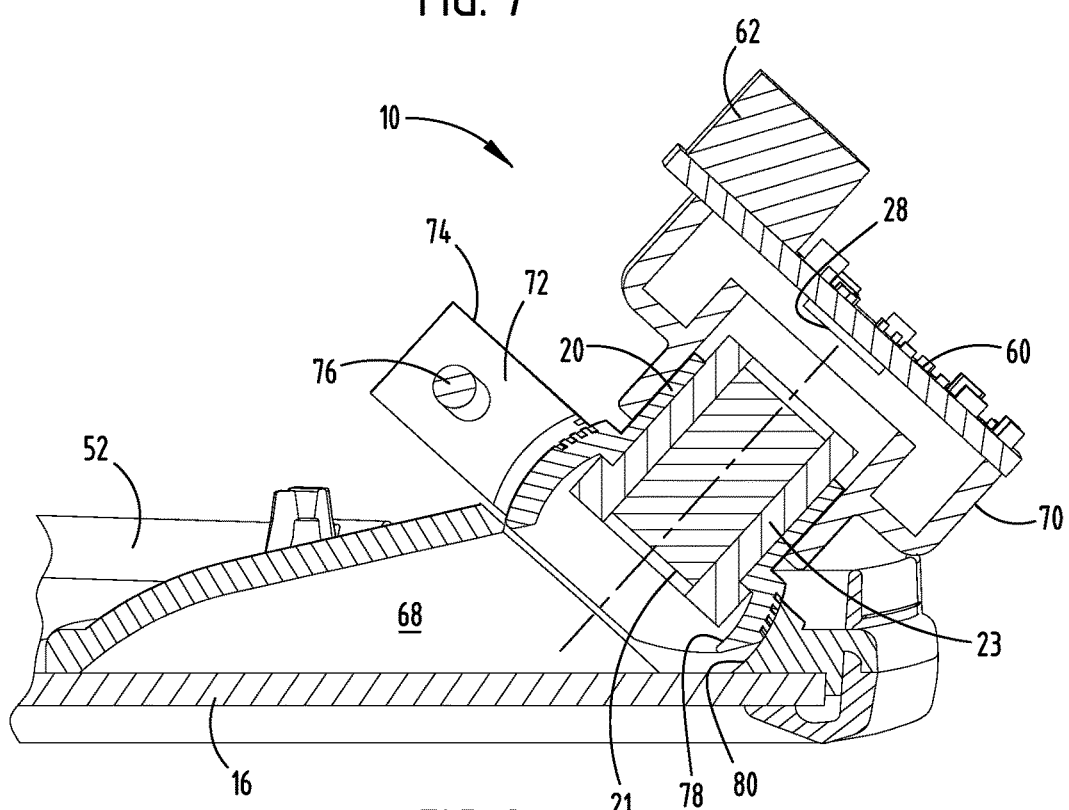
FIG. 8 is a top partial cross-sectional view taken at line VIII-VIII of FIG. 4.

As shown in FIG. 8, the illustrated embodiment of the imaging device 20 of the blind spot detection system 10 includes a recessed portion 68 disposed behind the substrate 16. In the event that the imaging device 20 is disposed behind an electrochromic system, it is contemplated that the imaging device 20 may be disposed behind the second surface of the first element. The imaging device 20 is coupled with a housing 70 that supports the circuit board 60 and the vehicle interface system 62. A mechanical connector 72, which, in the illustrated embodiment shown in FIGS. 7 and 8 includes a collar 74 with a mechanical fastener 76, is designed to support the imaging device 20 in position on the carrier plate 52. As further shown in FIG. 8, the imaging device 20 includes a rounded sleeve 78 that abuts a receiving aperture 80 of the carrier plate 52. Accordingly, if necessary, the imaging device 20 can be rotated into a desired direction upon loosening the mechanical fastener 76, and ultimately retightening the mechanical fastener 76 in the collar 74. The imaging device 20 is generally designed for removal from the carrier plate 52 for repair and/or replacement. In one embodiment, the lens 21 of the imaging device 20 is positioned 10 millimeters or less from the rear of the substrate 16. The lens 21 is generally shown provided in a lens barrel 23 located between the substrate 16 and an imager 28 of the imaging device 20, wherein the imager 28 is generally shown mounted to the circuit board 60. The lens 21 may include a single element lens or a multi element lens and may be constructed from plastic, glass, or a combination thereof. With respect to packaging concerns, the use of a single element lens instead of a multi element lens may enable a reduced packaging depth of the lens barrel 23, which may further lead to overall packaging reductions for the blind spot reduction system 10. Additionally, because of the slim design and packaged electronics of the blind spot detection system 10, the blind spot detection system 10 does not require connection to a separate imaging system that is disposed separate or outside of the rearview device 14. It is generally contemplated that the vehicle interface system 62 will receive information from a controller area network (CAN) bus in the vehicle 12, and also power to activate the imaging device 20.

Figure 9:
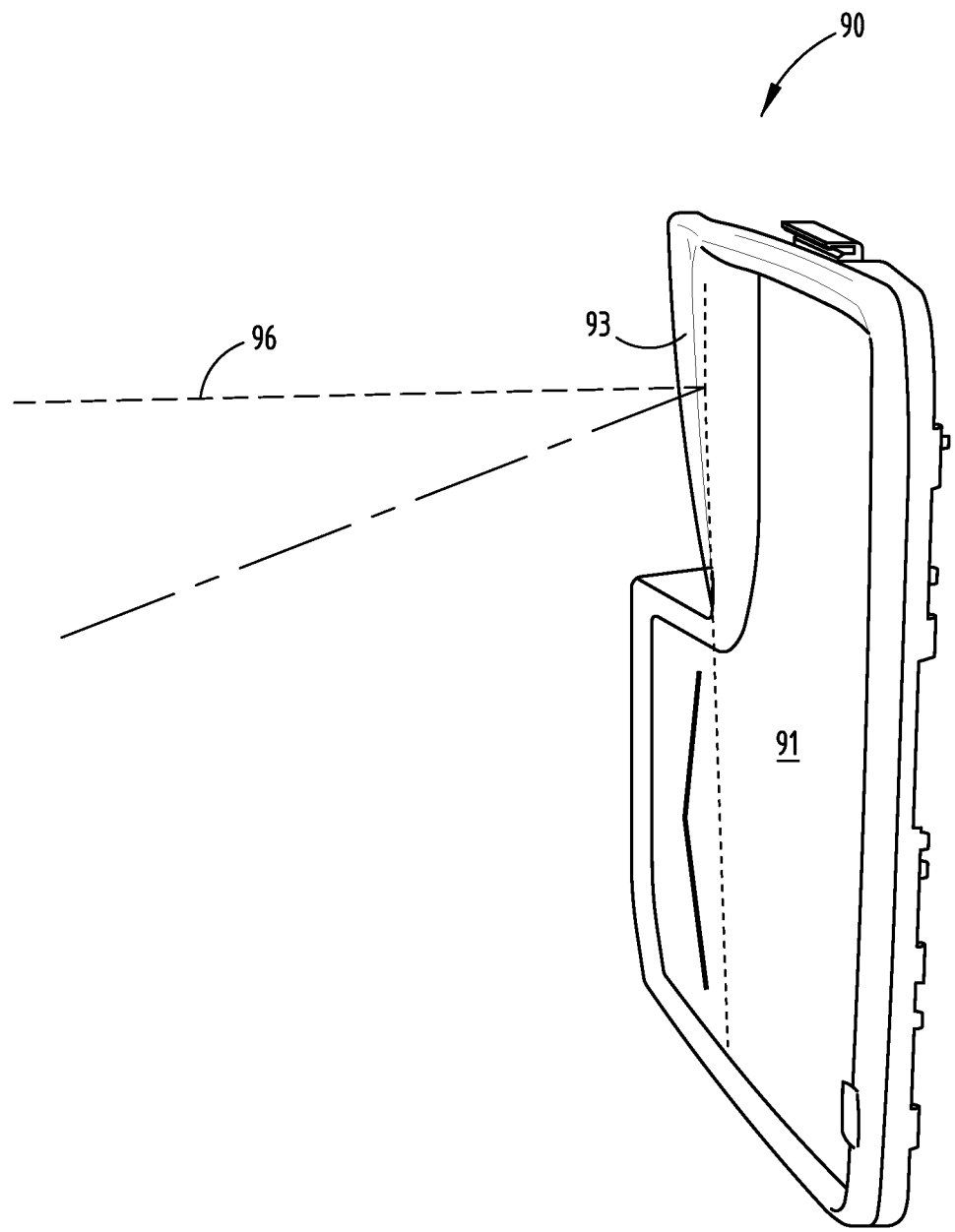
FIG. 9 is a side perspective view of another embodiment of a blind spot detection system.
Figure 10:
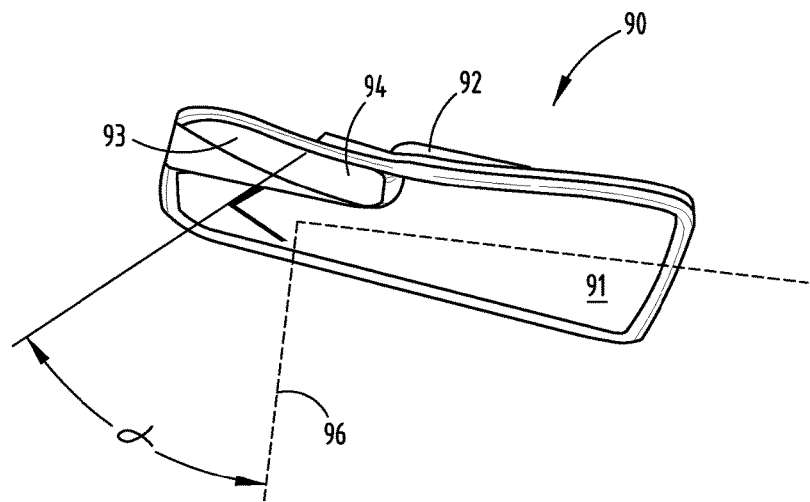
FIG. 10 is a top perspective view of the blind spot detection system of FIG. 9.

Referring now to FIGS. 9-11, another embodiment of the present invention includes an external rearview device 90 with a substrate 91 and an auxiliary mirror 93. The external rearview device 90 includes a primary viewing surface that relays a rearward view of the vehicle 12 to the driver. The rearward view may be generated by a reflective surface of the substrate 91 or may be an image display area that relays data from a rearview device imager.

Regarding the illustrative embodiment shown in FIGS. 9-11, the imaging device 20 of the blind spot detection system 10 may be positioned at an upper outboard position 92 proximate a rear surface of the substrate 91. In the illustrated embodiment, the substrate 91 includes a recessed viewing window 94 that is slightly set back and is angled relative to the planar extent of the primary viewing surface of the substrate 91 of the external rearview device 90. As shown in FIG. 9, the external rearview device 90 is angled 20 degrees downward from a line 96 that extends perpendicular from the planar extent of the primary viewing surface of the external rearview device 90. Moreover, as shown in FIG. 10, the viewing window 94 includes an angle such that the external rearview device 90 may include a nominal angle α that is 50 degrees from the line 96 that extends perpendicular to the planar extent of the substrate 91 of the external rearview device 90. Stated differently, the nominal angle α of the imaging device 20 extends at an angle that is 40 degrees from the planar extent of the first surface of the substrate 91 of the external device 90.

Further, as illustrated in FIG. 11, the imaging device 20 is also directed at an angle β, such that the vertical field of view relative to the ground extends 5.5 degrees upward. In addition, the imaging device 20 is generally directed downward toward the ground in a direction rearward of the vehicle 12. Accordingly, the imaging device 20 is capable of collecting image data that is a distance D behind the center of the ninety-fifth percentile eyellipse. In the illustrated embodiment, the distance D is equal to one meter. However, it is contemplated that the distance D could be greater than or less than one meter, depending on the position and angle of the imaging device 20 and the desired performance of the system. Accordingly, there is overlap between the peripheral vision line of the driver and the detection area defined by the blind spot detection system 10 of the present invention. Moreover, the detection area of the blind spot detection system 10 also overlaps with the primary field of view defined by the external rearview device 90. Therefore, a relatively complete field of view is available to the driver of the vehicle 12 from behind the vehicle 12, as generally provided by the substrate 91 of the external rearview device 90, all the way to a forward position in front of the driver. Thus, the dangers associated with the presence of the driver side blind spot area 24 are minimized or eliminated as the driver is no longer required to glance rearward to confirm that lateral movement of the vehicle 12 will result in a collision with another vehicle or object not easily observable to the driver.

Regardless of the position of the imaging device 20 behind the substrates 16, 91 of the external rearview devices 14, 90, windows proximate the blind spot detection systems 10 are generally configured to allow light to pass through the substrates 16, 91 of the respective external rearview device 14, 90. Therefore these windows have a higher level of transmissivity. Accordingly, sufficient light reaches the imaging device 20 such that object or vehicle detection in the driver side blind spot area 24 is possible. The imaging device 20 includes a very slim profile, such that additional size constraints are not required of the housing. As illustrated in FIG. 8, the imaging device 20 is in very close proximity to a rearward surface of the substrate 16 of the external rearview device 14.

Referring now to FIGS. 12 and 13, the blind spot detection system 10 is aimed in the direction of the space between the peripheral vision line 40 of the driver and the primary field of view 32 of the external rearview device 14, 91, which is arbitrarily shown as external rearview device 14. The imaging device 20 is generally directed between the primary field of view 32 and the peripheral vision line 40 of the driver and covers a horizontal area having an angle α of approximately 40 degrees. The 40 degrees overlaps at least a portion of the peripheral vision line 40 of the driver and the primary field of view 32 of the external rearview device 14. The primary field of view 32 of the rearview device 14 extends from the vehicle 12 outward approximately 17 degrees. Moreover, with respect to FIG. 12, the imaging device 20 is also directed at an angle approximately 5.5 degrees downward. Referring back to FIG. 11, the imagine device 20 covers a vertical area, wherein the angle β is also 40 degrees, similar to the angle α associated with the horizontal area shown in FIG. 12. Accordingly, the driver side blind spot area 24 of the vehicle 12 is generally encompassed by the field of view 22 of the imaging device 20.

It is also contemplated that the blind spot detection system 10, as defined above, could be used to detect vehicles or objects in a passenger side blind spot area 25, as generally shown in FIG. 13. The passenger side blind spot area 25 is generally defined by the space disposed between a line defining a peripheral view of a driver in the direction of a passenger and an outboard most field of view generated by a passenger side rearview device. In some vehicles, there may not be a passenger blind spot area 25. However, in those instances where a blind spot area 25 is located on the passenger side of the vehicle, the blind spot detection system 10 could be used in conjunction with a rearview device on the passenger side. The blind spot detection system 10 can also be used with other rearview devices, for example, a heater, to minimize ice build up near the imaging device 20. Moreover, surface treatments can be applied to the substrates 16, 91 to minimize water and/or ice build up thereon, which could possibly impair the capability of the imaging device 20 from capturing image data in the respective driver side blind spot area 24 and/or the passenger side blind spot area 25. The surface treatments can include hydrophilic materials and/or hydrophobic materials.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A blind spot detection system for a vehicle comprising:
   an external rearview device including a substrate having an at least partially transmissive portion;
   a removable imaging device comprising a rounded sleeve; and
   a carrier plate comprising:
      a rounded receiving aperture; and
      a mechanical fastener proximate the receiving aperture, the mechanical fastener comprising a collar; and
   wherein the removable imaging device is supported by the carrier plate and is positioned behind the carrier plate and the at least partially transmissive portion;
   wherein the rounded sleeve of the removable imaging device is configured to rotateably engage with the collar of the mechanical fastener and the rounded receiving aperture of the carrier plate; and
   wherein the removable imaging device includes a field of view that extends through the substrate at an angle away from the vehicle in a direction of a vehicle blind spot.

2. The blind spot detection system of claim 1, wherein the imaging device includes a field of view that extends approximately 40 degrees.

3. The blind spot detection system of claim 1, wherein the imaging device is directed approximately 20 degrees downward.

4. The blind spot detection system of claim 1, further comprising:
   a heater assembly disposed proximate the imaging device.

5. The blind spot detection system of claim 1, wherein the substrate includes an electrochromic mirror construction having a first element, a second element, and an electrochromic material disposed therebetween.

6. The blind spot detection system of claim 1, wherein the at least partially transmissive portion is defined by a window adjacent a lens of the imaging device.

7. The blind spot detection system of claim 1, wherein the imaging device comprises an imager disposed on a circuit board that is coupled to a vehicle interface system, and wherein the imager and the vehicle interface system are positioned on opposite surfaces of the circuit board.

8. The blind spot detection system of claim 7, wherein the circuit board is coupled to a blind spot detection indicator located proximate an outer edge of the substrate.

9. The blind spot detection system of claim 1, wherein the mechanical connector is configured to allow the imaging device to be rotated to a desired position and fixedly secure the imaging device in the desired position.

10. The blind spot detection system of claim 1, wherein the imaging device comprises a lens provided in a lens barrel and located between the substrate and an imager of the imaging device, and wherein the lens is positioned 10 millimeters or less from a rear of the substrate.

11. An external rearview assembly for a vehicle comprising:
   a substrate including an image display portion and an at least partially transmissive portion, wherein the image display portion provides a rearward field of view to a vehicle driver;
   a carrier plate supporting the substrate, the carrier plate comprising:
      a rounded receiving aperture; and
      a mechanical fastener proximate the receiving aperture, the mechanical fastener comprising a collar; and
   an imaging device comprising a rounded sleeve, wherein the imaging device is positioned behind the at least partially transmissive portion of the substrate and removably coupled to the rounded receiving aperture of the carrier plate via the mechanical connector, wherein a field of view of the imaging device is adjustable by rotating the imaging device in the rounded receiving aperture and the collar of the mechanical connector; and
   wherein the field of view of the imaging device extends through the substrate and covers an area disposed between the rearward field of view of the image display portion and a peripheral line of vision extending from inside the vehicle.

12. The external rearview assembly of claim 11, wherein the field of view extends approximately 40 degrees.

13. The external rearview assembly of claim 11, wherein the imaging device is directed approximately 20 degrees downward.

14. The external rearview assembly of claim 11, wherein the at least partially transmissive portion is defined by a window adjacent a lens of the imaging device.

15. The external rearview assembly of claim 11, wherein the imaging device comprises an imager disposed on a circuit board that is coupled to a vehicle interface system, wherein the imager and the vehicle interface system are positioned on opposite surfaces of the circuit board, and wherein the circuit board is coupled to a blind spot detection indicator located proximate an outer edge of the substrate.

16. An external rearview assembly for a vehicle comprising:
   an electrochromic substrate that includes a first element defining first and second surfaces, and a second element defining third and fourth surfaces, wherein a portion of the electrochromic substrate includes an at least partially transmissive window, and wherein the electrochromic substrate is configured to provide a driver with a first field of view;
   an imaging device comprising a rounded sleeve, the imaging device is positioned proximate the at least partially transmissive window, wherein the imaging device defines a second field of view that extends through the electrochromic substrate and covers an area generally disposed between a side of the vehicle and the first field of view; and a carrier plate comprising:
  a rounded receiving aperture; and
  a mechanical fastener proximate the receiving aperture, the mechanical fastener comprising a collar; and wherein the rounded sleeve of the removable imaging device is configured to rotateably engage with the collar of the mechanical fastener and the rounded receiving aperture of the carrier plate;

a circuit board operably coupled to the imaging device; and a blind spot indicator operably coupled to the circuit board, wherein the circuit board is disposed inside said external rearview assembly and controls operation of the imaging device and the blind spot indicator free of intervention from a vehicle control system.

17. The external rearview assembly of claim 16, wherein the imaging device covers an area disposed between the first field of view and a line defining a peripheral line of vision extending from a driver position inside the vehicle.

18. The external rearview assembly of claim 16, wherein the second field of view extends approximately 40 degrees.

19. The external rearview assembly of claim 16, wherein the imaging device is directed approximately 20 degrees downward.

\* \* \* \* \*